United States Patent
Yoshikawa et al.

(10) Patent No.: US 8,179,818 B2
(45) Date of Patent: May 15, 2012

(54) PROXY TERMINAL, SERVER APPARATUS, PROXY TERMINAL COMMUNICATION PATH SETTING METHOD, AND SERVER APPARATUS COMMUNICATION PATH SETTING METHOD

(75) Inventors: Takashi Yoshikawa, Yokosuka (JP);
Motoharu Miyake, Yokosuka (JP);
Hiroshi Inamura, Cupertino, CA (US);
Toshirou Kawahara, Yokohama (JP);
Minoru Etoh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 253 days.

(21) Appl. No.: 12/096,654

(22) PCT Filed: Dec. 7, 2006

(86) PCT No.: PCT/JP2006/324487
§ 371 (c)(1),
(2), (4) Date: Nov. 6, 2008

(87) PCT Pub. No.: WO2007/066738
PCT Pub. Date: Jun. 14, 2007

(65) Prior Publication Data
US 2009/0285118 A1 Nov. 19, 2009

(30) Foreign Application Priority Data

Dec. 7, 2005 (JP) .................................. 2005-353466
Jun. 23, 2006 (JP) .................................. 2006-174611

(51) Int. Cl.
*H04L 12/28* (2006.01)

(52) U.S. Cl. .......................................... 370/254; 705/35

(58) Field of Classification Search .................. 370/254; 705/35
See application file for complete search history.

(56) References Cited

U.S. PATENT DOCUMENTS

| 6,360,265 | B1 * | 3/2002 | Falck et al. ..................... 709/227 |
| 7,506,036 | B1 * | 3/2009 | Cook .............................. 709/220 |
| 2003/0013445 | A1 | 1/2003 | Fujiwara et al. |
| 2003/0016636 | A1 | 1/2003 | Tari et al. |
| 2003/0233329 | A1 * | 12/2003 | Laraki et al. ..................... 705/52 |

(Continued)

FOREIGN PATENT DOCUMENTS

CN 1418446 A 5/2003
(Continued)

OTHER PUBLICATIONS

Office Action issued Nov. 24, 2010 in JP Application No. 2006-174611 (With English Translation).

*Primary Examiner* — Dang Ton
*Assistant Examiner* — Wei Zhao
(74) *Attorney, Agent, or Firm* — Oblon, Spivak, McClelland, Maier & Neustadt, L.L.P.

(57) ABSTRACT

In a proxy terminal or server a path setting can be performed by a server apparatus and a path setting that includes, as a relay point, a proxy terminal arbitrarily specified by a user or the proxy terminal located in a local network to which the user belongs, without adding any function to a user terminal. The proxy terminal includes a terminal group information generator unit configured to generate terminal group information that includes a user terminal identifier and a proxy terminal network identifier as a pair, and to transmit, to a server apparatus, the generated terminal group information.

6 Claims, 14 Drawing Sheets

U.S. PATENT DOCUMENTS

| | | | |
|---|---|---|---|
| 2003/0233583 A1* | 12/2003 | Carley | 713/201 |
| 2004/0044768 A1* | 3/2004 | Takahashi | 709/225 |
| 2006/0242037 A1* | 10/2006 | Tanimura et al. | 705/35 |

FOREIGN PATENT DOCUMENTS

| | | |
|---|---|---|
| EP | 1 244 321 A1 | 9/2002 |
| JP | 2001-306441 | 11/2001 |
| JP | 2004-341576 | 12/2004 |
| JP | 2005-174317 | 6/2005 |
| JP | 2005-175934 | 6/2005 |
| KR | 2002-0065001 | 8/2002 |
| TW | 591959 | 7/1991 |
| TW | I252003 | 3/2006 |
| WO | WO 02/41659 A1 | 5/2002 |
| WO | WO 03/032617 A1 | 4/2003 |
| WO | WO 2004/081718 A2 | 9/2004 |

* cited by examiner

FIG. 6

| USER TERMINAL IDENTIFIER | PROXY TERMINAL NW IDENTIFIER |
|---|---|
| ABCD12345678 | 192. 168. 1. 2: 8080 |
| LSID93826710 | 192. 168. 1. 3: 8080 |
| DYWM10278347 | 192. 168. 1. 45: 10080 |

FIG. 7

WHEN HOME GATEWAY DOES NOT EXIST

```
GET/index.html HTTP/1.1
Accept: */*
Accept-Language: ja
If-Modified-Since: Mon, 04 Dec 2000 00: 11: 45 GMT: length=35
User-Agent: Mozilla/4.0 (compatible; MSIE 5. 5; Windows NT5. 0)
Host: ServerName
Connection: Keep-Alive
X-HTTP-Proxy-Private-Addr: 192. 168. 1. 2: 8080
```

PROXY TERMINAL NW IDENTIFIER

FIG. 8

WHEN HOME GATEWAY EXISTS

```
GET/index. html HTTP/1. 1
Accept: */*
Accept-Language: ja
If-Modified-Since: Mon, 04 Dec 2000 00: 11: 45 GMT: length=35
User-Agent: Mozilla/4.0 (compatible; MSIE 5. 5; Windows NT 5. 0)
Host: ServerName
Connection: Keep-Alive        ADD yes/no INFORMATION
X-HTTP-HomeGW:yes
X-HTTP-Proxy-Class: [1] FOMA (XXXXXX) Cert OK
X-HTTP-Proxy-Class: [2] MOVA (XXXXXX) Cert NG
```

ADD PROXY TERMINAL INFORMATION

FIG. 9

AN EXAMPLE OF PARTICULAR TAG IN      PATH INFOMATION
PARTICULAR TAG ATTACHED CONTENTS

```
<X-HTTP-A href="http: // $proxy [2]_url$/-_-www. XXXXXX. ne. jp/purchase. php"
      SessionID="ABCD12345678">
PURCHASE SITE</X-HTTP-A>
```

USER TERMINAL IDENTIFIER

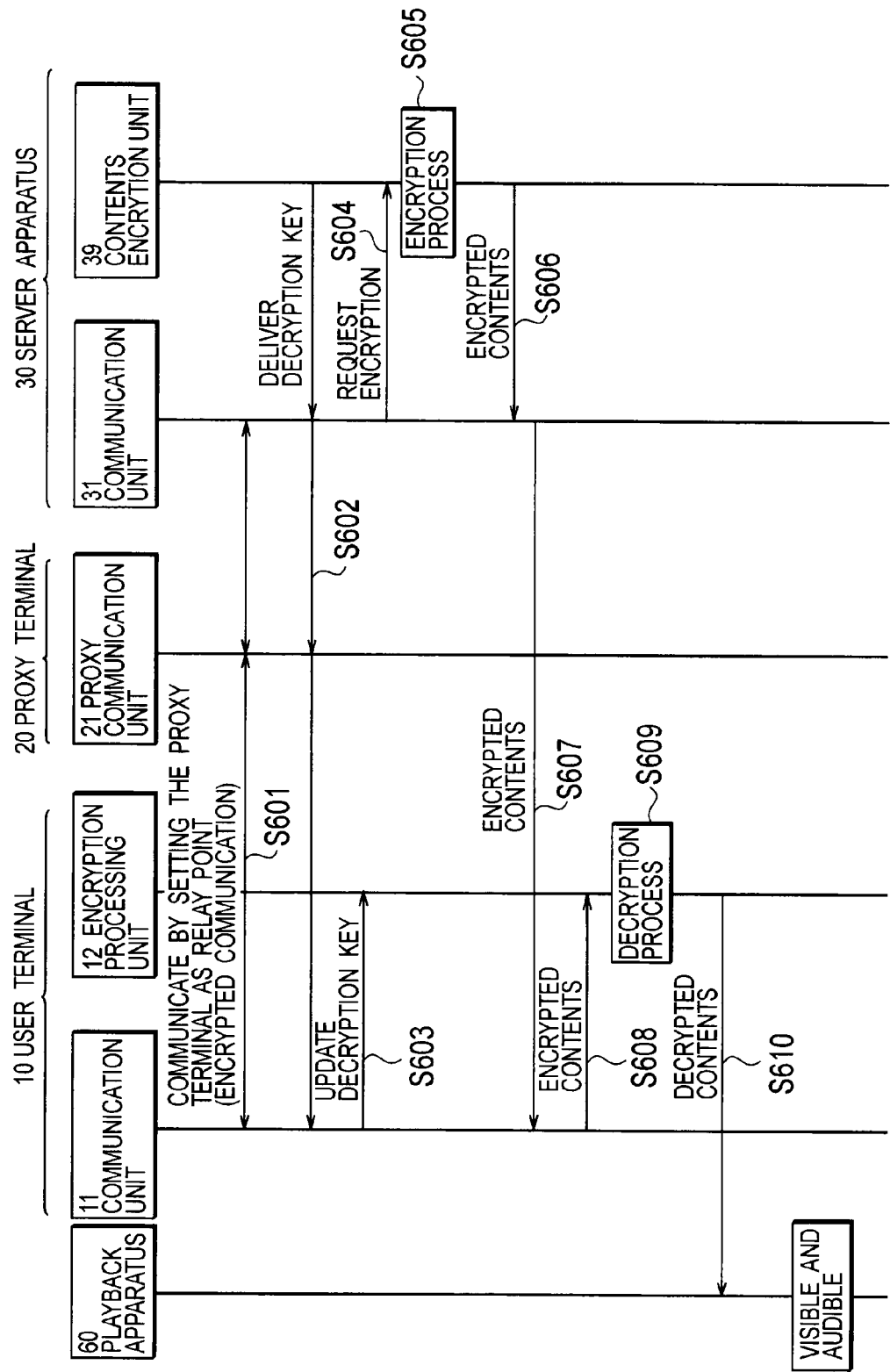

PROXY TERMINAL, SERVER APPARATUS, PROXY TERMINAL COMMUNICATION PATH SETTING METHOD, AND SERVER APPARATUS COMMUNICATION PATH SETTING METHOD

TECHNICAL FIELD

The present invention relates to a proxy terminal, a server apparatus, a proxy terminal communication path setting method, and a server apparatus communication path setting method.

BACKGROUND ART

Heretofore, in order to ensure anonymity and safety in a communication, there have been numbers of techniques in which the communication between a user terminal and a server apparatus is relayed via a relay apparatus set as a relay point, instead of a direct communication in which the communication is performed between the user terminal and the server apparatus.

For example, there has been an HTTP proxy software apparatus such as "Delegate," in which a communication path can be freely set by a user's manual setting (e.g., refer to Non-Patent Document 1).

Further, there has also been a server apparatus for "CDN (Contents Delivery Network)" or "Akamai," or the like, configured to lead a user (a user terminal) to a arbitrary server apparatus by rewriting a link destination (URL) of contents (e.g., refer to Patent Document 1).

In recent years, the number of contents on the Internet has dramatically been increased, and various network services using these contents have been provided.

User terminals on the client side for these network services are not necessarily computer apparatuses, but they are in many cases household electrical appliances such as TVs.

In many cases, these user terminals are provided only with a simple communication function, and are not provided with an encrypted communication path function, a holding function of client certificates, a client authentication function, an encryption decryption function, and the like.

Meanwhile, the user possibly possesses high performance user terminals such as a computer apparatus and a cellular phone terminal, in the house.

Accordingly, it can be considered that setting a proxy terminal having a high performance as the relay point so as to perform various processes at this proxy terminal, when an important communication such as a transmission or reception of important contents and a charging protocol is performed.

In addition, by considering a safety and a charging, it is desirable that this proxy terminal and the user terminal be located within the same local network.

On the other hand, it is rather efficient for communication which is not particularly important to be directly performed between the user terminal and the server apparatus.

Further, in providing network services, the server apparatus side holds information necessary to determine an importance of contents.

Hence, there has been required to realize a configuration in which the server apparatus performs a path setting in accordance with the importance of the communication so as to relay the proxy terminal having the high performance, instead of adding a high performance function to the user terminal such as a TV.

However, there has been a problem that the foregoing conventional technique cannot be applied to the HTTP proxy software apparatus in which the path setting by the server apparatus side cannot be performed.

In addition, the server apparatus for the CDN according to the foregoing conventional technique unilaterally determines the proxy terminal as the relay point. Accordingly, there has been a problem that the user cannot set an arbitrary terminal as the proxy terminal, nor set the path which relays, as the proxy terminal, an apparatus in the local network to which the user belongs.

Patent Document 1: U.S. Pat. No. 6,108,703 "GLOBAL HOSTING SYSTEM"

Non-patent Document 1: Herbert M. Engel, "How to Delegate: A Guide to Getting Things Done," Gulf Pub Co., ISBN: 0872011704. July 1983

DISCLOSURE OF THE INVENTION

Thus, the present invention has been made in view of the foregoing problems, and an object thereof is to provide a proxy terminal, a server apparatus, a proxy terminal communication path setting method, and a server apparatus communication path setting method, which enables a path setting performed by the server apparatus and a path setting which sets, as a relay point, the proxy terminal arbitrarily specified by a user or the proxy terminal located in a local network to which the user belongs.

A first aspect of the present invention is summarized as a proxy terminal, including a terminal group information generator unit configured to generate terminal group information which includes a user terminal identifier and a proxy terminal network identifier as a pair; and a terminal group information transmitter unit configured to transmit, to a server apparatus, the terminal group information generated by the terminal group information generator unit.

In the first aspect of the present invention, the terminal group information generator unit may be configured to acquire the user terminal identifier and a terminal group information transmission destination network identifier, from proxy terminal log in contents which is acquired by a user terminal from the server apparatus and includes the user terminal identifier and the terminal group information transmission destination network identifier as information in the contents, and to generate the terminal group information which includes the acquired user terminal identifier and the proxy terminal network identifier as the pair, and the terminal group information transmitter unit may be configured to transmit the terminal group information generated by the terminal group information generator unit, to a terminal group information transmission destination server apparatus which is described in the terminal group information transmission destination network identifier acquired from the proxy terminal log in contents.

In the first aspect of the present invention, the proxy terminal may further include a terminal group information updating unit configured to detect a change in the proxy terminal network identifier included in the terminal group information, to generate new terminal group information, and to transmit the new terminal group information to the server apparatus.

In the first aspect of the present invention, the user terminal identifier may include at least an identifier for identifying the user terminal, and an identifier for identifying communication contents between the user terminal and the server apparatus.

In the first aspect of the present invention, the proxy terminal may further include a communication data receiving unit configured to receive communication data transmitted from the user terminal or the server apparatus; and a communication relaying unit configured to relay the communication data between the user terminal and the server apparatus, based on communication path information which is included in the communication data and indicates that the proxy terminal is set as a relay point.

In the first aspect of the present invention, the proxy terminal may further include a charging information generator unit configured to generate charging information which includes at least a proxy terminal identifier and the user terminal identifier, when the communication data receiving unit receives the communication data transmitted from the user terminal; and the communication relaying unit may be configured to relay, to the server apparatus, the communication data to which the charging information generated by the charging information generator unit is added.

A second aspect of The present invention is summarized as a server apparatus, including: a terminal group information receiving unit configured to receive, from a proxy terminal, terminal group information which includes a user terminal identifier and a proxy terminal network identifier as a pair; and a user terminal identifying unit configured to receive an access request from a user terminal, and to identify the user terminal based on the received access request; a communication path setting unit configured to acquire the terminal group information which is received by the terminal group information receiving unit and corresponds to the user terminal identified by the user terminal identifying unit, and to set a communication path which sets, as a relay point, the proxy terminal corresponding to the user terminal; and a path information attached contents generator transmitter unit configured to generate contents including communication path information which indicates the communication path set by the communication path setting unit, and to return the generated contents to the user terminal.

The second aspect of the preset invention may further include a proxy terminal log in contents generator unit configured to generate proxy terminal log in contents which includes the user terminal identifier and a terminal group information transmission destination network identifier as information in the contents; and a proxy terminal log in content transmitter unit configured to transmit the proxy terminal log in contents generated by the proxy terminal log in contents generator unit, to the user terminal in response to a request from the user terminal.

The second aspect of the preset invention may further include a communication data receiving unit configured to receive, from the proxy terminal, communication data to which charging information including at least a proxy terminal identifier and the user terminal identifier is added; and a charging process unit configured to perform a charging process on the proxy terminal, based on the charging information added to the communication data.

A third aspect of the present invention is summarized as a proxy terminal communication path setting method, including: generating, at a proxy terminal, terminal group information which includes a user terminal identifier and a proxy terminal network identifier as a pair; and transmitting, from the proxy terminal to the server apparatus, the generated terminal group information.

A fourth aspect of the present invention is summarized as a server apparatus communication path setting method, including: receiving, at a server apparatus from a proxy terminal, terminal group information which includes a user terminal identifier and a proxy terminal network identifier as a pair; receiving, at the server apparatus, an access request from a user terminal; identifying, at the server apparatus, the user terminal based on the received access request; acquiring, at the server apparatus, the received terminal group information which corresponds to the identified user terminal; setting, at the server apparatus, a communication path which sets, as a relay point, the proxy terminal corresponding to the user terminal; generating, at the server apparatus, contents including communication path information which indicates the set communication path; and transmitting, at the server apparatus, the generated contents to the user terminal.

BRIEF DESCRIPTION OF THE DRAWINGS

FIG. 6 is an example of terminal group information according to the first and second embodiments.

FIG. 7 is an example of an HTTP request including terminal group information according to the first embodiment.

FIG. 8 is an example of an HTTP request including terminal group information and home gateway information according to the second embodiment.

FIG. 9 is a description example of a special tag according to the second embodiment.

FIG. 16 is a sequence diagram showing a communication path setting method according to the fifth embodiment.

BEST MODES FOR CARRYING OUT THE INVENTION

Figure 1:
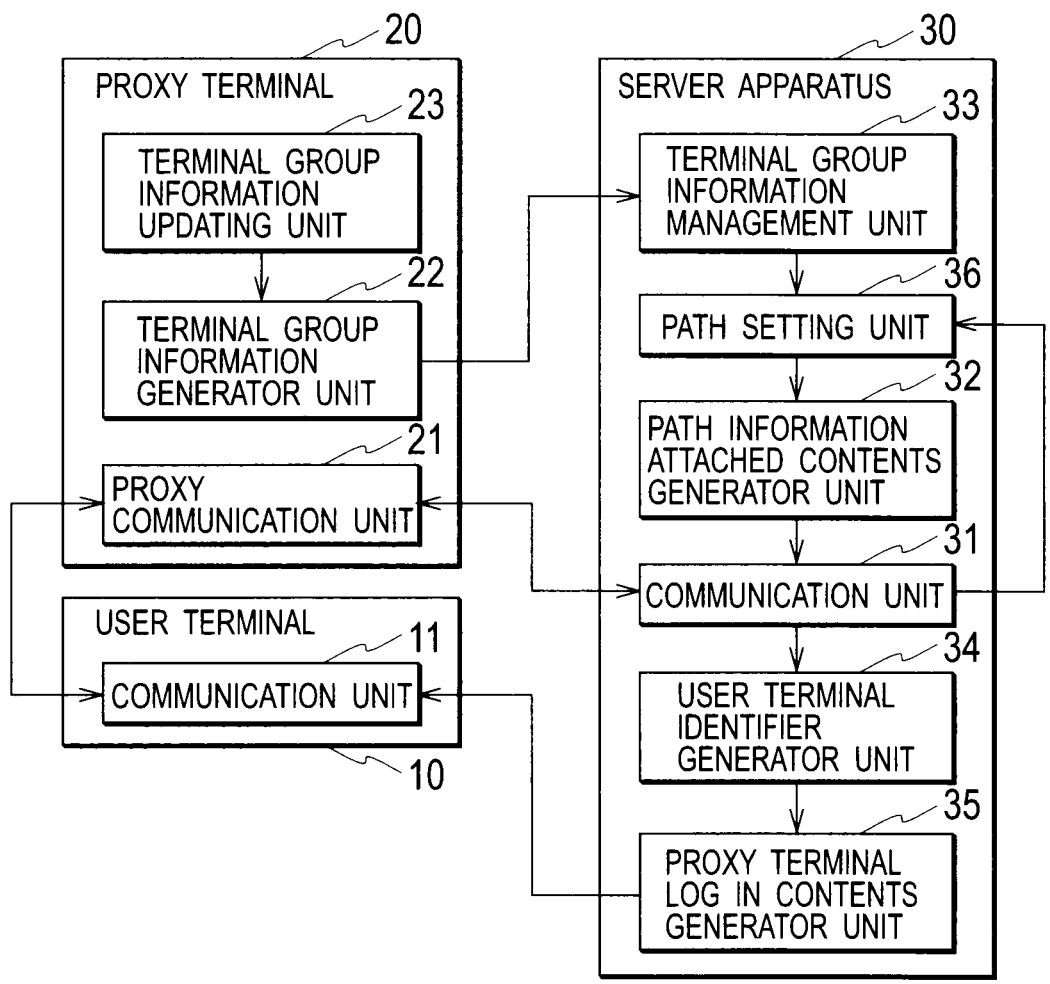
FIG. 1 is a configuration block diagram of a communication path setting system according to a first embodiment.

Next, with reference to the accompanying drawings, embodiments of the present invention will be described. In the description of the drawings, the same or similar reference numerals denote the same or similar elements. However, it should be noted that the drawings are schematic.

<First Embodiment>

(Communication Path Setting System)

As shown in FIG. 1, a communication path setting system according to a first embodiment includes a user terminal 10, a proxy terminal 20, and a server apparatus 30.

The user terminal 10 is a terminal such as a TV used by a user, and includes a communication function to communicate on the Internet, a simple Web browser function, and a Cookie function. However, the user terminal 10 is a low performance terminal not including an encryption decryption function, a client authentication function, a client certificate function, and the like.

The user terminal 10 includes a CPU, a memory, a communication module, a display, an operation interface, and the like.

The proxy terminal 20 is a communication terminal such as a cellular phone, and includes the communication function to communicate on the Internet, and also includes an HTTP proxy function which relays a communication between the user terminal 10 and the server apparatus 30.

The proxy terminal 20 is a high performance terminal including such as an encryption decryption function, a client authentication function, a client certificate function, a camera and a two-dimensional bar-code reader, in addition to a CPU, a memory, a communication module, a display, and an operation interface.

The server apparatus 30 is a general Web server. To be more precise, the server apparatus 30 can communicate with the user terminal 10 and with the proxy terminal 20, by using the HTTP protocol, via the Internet. The server apparatus 30 includes a CPU, a memory, a communication module, Web contents, and the like.

In the description hereinbelow, "user terminal identifier" includes at least an identifier (a user terminal ID) for identifying the user terminal 10, and an identifier for identifying communication contents between the user terminal 10 and the server apparatus 30.

Here, the user terminal ID is, for example, a character string which is stored in the user terminal 10 and is ensured to be unique.

Further, the identifier for identifying the communication contents between the user terminal 10 and the server apparatus 30 is referred to, for example, an identifier to be allocated to each HTTP session between the user terminal 10 and the server apparatus 30, and is an identifier (a session ID) for identifying an HTTP session of the user terminal 10 at the server apparatus 30.

Based on such a session ID, the communication contents (e.g., contents acquired by the user terminal) in the HTTP session are identified.

Incidentally, for the session ID, for example, a hash value including a user terminal ID and a time stamp is used.

Further, a "proxy terminal network identifier" is referred to information for identifying the proxy terminal 20 on a network. The proxy terminal network identifier is an identifier necessary for connecting the user terminal 10 and the proxy terminal 20.

Here, as the proxy terminal network identifier, for example, a set of an IP address and a port number of the proxy terminal can be cited.

Further, "terminal group information" is referred to information combining the user terminal identifier and the proxy terminal network identifier as a pair.

For example, as shown in FIG. 6, [192.168.1.2 (IP address of a proxy terminal), 8080 (the port number of the proxy terminal), ABCD12345678 (a user terminal identifier)] can be cited as an example the terminal group information.

Further, "path information" is referred to information representing a communication path. As the path information, for example, a URL can be cited.

Next, module configurations of respective apparatuses according to the first embodiment will be described with reference to FIG. 1.

The server apparatus 30 includes a communication unit 31, a path information attached contents generator unit 32, a terminal group information management unit 33, a user terminal identifier generator unit 34, a proxy terminal log in contents generator unit 35, and a path setting unit 36.

The communication unit 31 returns an HTTP response in response to an HTTP request from the user terminal 10 or the proxy terminal 20.

Further, when the terminal group information is transmitted in response to the HTTP request, the communication unit 31 transmits the terminal group information to the terminal group information management unit 33.

Based on the path information set by the path setting unit 36, the path information attached contents generator unit 32 generates "path information attached contents" in which a URL including the proxy terminal network identifier is embedded, and transmits the path information attached contents to the communication unit 31.

The terminal group information management unit 33 receives the terminal group information from a terminal group information generator unit 22 of the proxy terminal 20, manages the terminal group information for each of the user terminal identifier, and returns the terminal group information in response to a request from the path setting unit 36.

When an HTTP session between a communication unit 11 of the user terminal 10 and the server apparatus 30 is started, the user terminal identifier generator unit 34 generates the user terminal identifier for each of the HTTP sessions, and returns the generated user terminal identifier to the communication unit 11.

Here, the user terminal identifier is a unique character string which is stored in a cookie function of the user terminal.

The proxy terminal log in contents generator unit 35 generates proxy terminal log in contents in response to a request from the user terminal identifier generator unit 34, and returns the generated proxy terminal log in contents to the user terminal 10.

Here, the proxy terminal log in contents includes a link character string, which adds, as a parameter, the user terminal identifier for the URL of a terminal group information transmission destination.

The path setting unit 36 receives the terminal group information from the terminal group information management unit 33 in response to an access from the user terminal 10 and depending on contents, generates path information by setting, as a relay point, the proxy terminal identified by the proxy terminal network identifier included in the terminal group information, and transmits the generated path information to the path information attached contents generator unit 32.

Further, the proxy terminal 20 includes a proxy communication unit 21, the terminal group information generator unit 22, and a terminal group information updating unit 23.

The proxy communication unit 21 transmits the HTTP request received from the user terminal 10, to the server apparatus 30, and returns, to the user terminal 10, the HTTP response from the server apparatus 30.

The terminal group information generator unit 22 acquires the user terminal identifier from proxy terminal log in contents accessed by the user terminal 10, and combines the user terminal identifier and the proxy terminal network identifier as the pair (for example, an IP address of the proxy terminal 20, and the port number for listening of the communication unit 21 of the proxy terminal 20) so as to generate the terminal group information.

Thereafter, the terminal group information generator unit 22 transmits the terminal group information to the URL of the terminal group information transmission destination included in the proxy terminal log in contents.

The terminal group information updating unit 23 monitors the proxy terminal network identifier and the user terminal identifier. When any change is occurred in the proxy terminal network identifier and the user terminal identifier, the terminal group information updating unit 23 certainly notifies the occurred change, to the terminal group information management unit 33 in the server apparatus 30.

In addition, the user terminal 10 includes the communication unit 11.

The communication unit 11 transmits the HTTP request to the server apparatus 30 and the proxy terminal 20, and receives the HTTP response with respect to the HTTP request.

When the user terminal identifier is transmitted from the server apparatus 30, the communication unit 11 stores the user terminal identifier in the cookie function, and thereafter transmits the user terminal identifier when requested from the server apparatus 30.

(Communication Path Setting Method)

Figure 2:
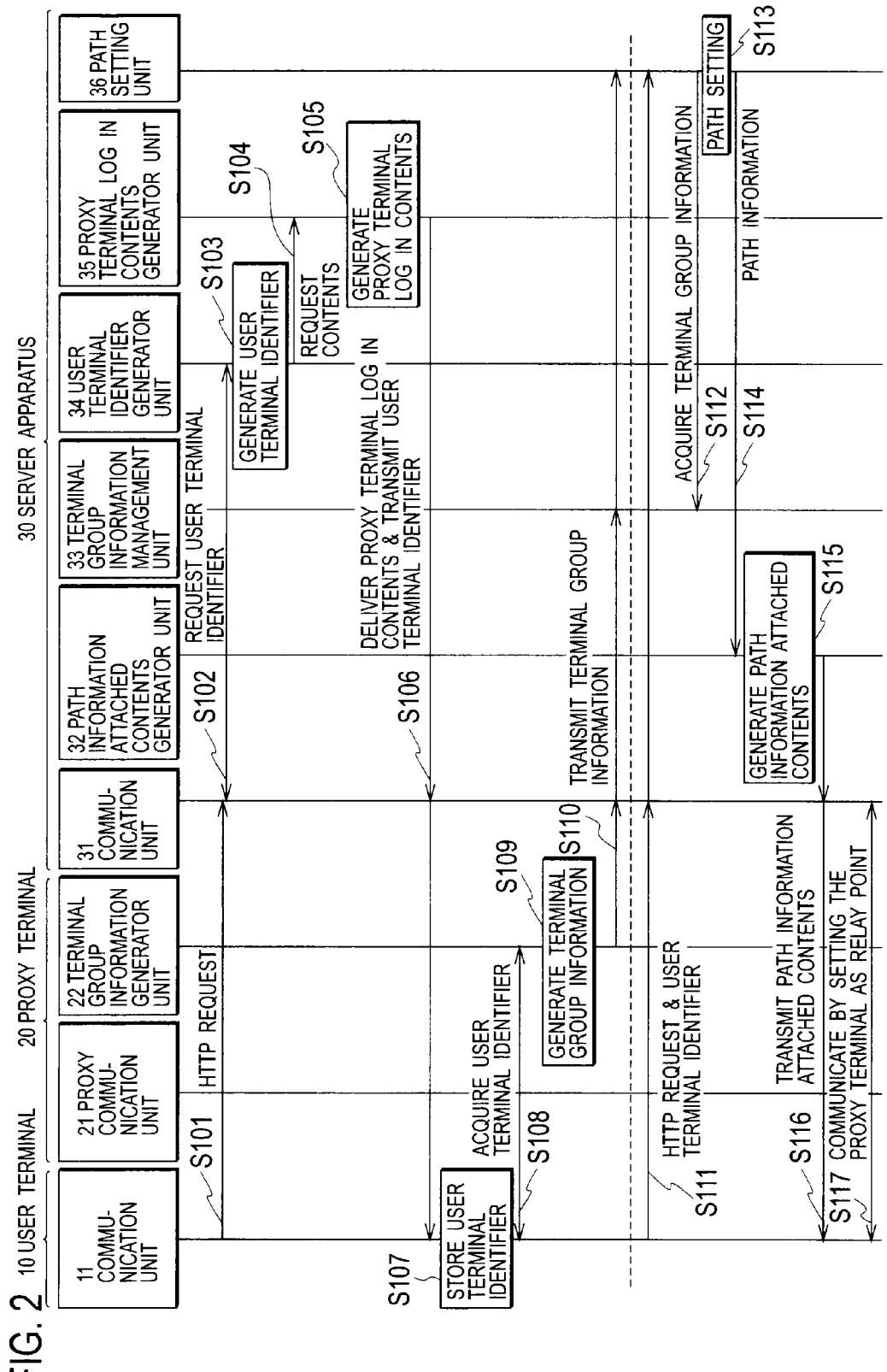
FIG. 2 is a sequence diagram showing a communication path setting method according to the first embodiment.

Subsequently, operation of the proxy terminal 20 and the server apparatus 30 according to the first embodiment will be described. FIG. 2 is a sequence diagram showing operation of the proxy terminal 20 and the server apparatus 30 according to this embodiment.

Firstly, procedures of acquiring the terminal group information will be described.

The communication unit 11 of the user terminal 10 transmits an HTTP request to the server apparatus 30 (Step S101).

The communication unit 31 requests the user terminal identifier generator unit 34 to generate a user terminal identifier so as to identify the user terminal 10 (Step S102).

The user terminal identifier generator unit 34 generates a unique identifier (a character string or the like) for identifying the user terminal 10 (Step S103), and transmits the generated identifier to the proxy terminal log in contents generator unit 35 (Step S104).

The proxy terminal log in contents generator unit 35 generates a URL of a terminal group information transmission destination to which the received user terminal identifier is added as a parameter (Step S105), embeds the generated URL in the proxy terminal log in contents in a two-dimensional bar-code format, and transmits the generated URL to the communication unit 11 (Step S106).

For example, information in the two-dimensional bar-code format is in the form of: "http://www.docomo.ne.jp/login.php?SessionID=ABCD12345678."

Here, the portion before "?SessionID=" indicates the URL of the terminal group information transmission destination (in this embodiment, the communication unit 31), and the portion after the "?SessionID=" indicates the user terminal identifier.

Next, the communication unit 11 of the user terminal 10 stores the user terminal identifier in the cookie function (Step S107).

Hereinafter, since the user terminal identifier stored in the cookie function of the user terminal 10 is required to be included in the HTTP request from the user terminal 10 so as to identify the user terminal 10, the server apparatus 30 certainly embeds a cookie request in every Web page to be generated.

Next, the user operates a camera and a two-dimensional bar-code reader attached to the proxy terminal 20 so as to read a two-dimensional bar-code included in the proxy terminal log in contents (Step S108).

As described above, the two-dimensional bar-code includes the URL of the terminal group information transmission destination to which the user terminal identifier is added as the parameter.

The terminal group information generator unit 22 combines the acquired user terminal identifier and the network identifier of the proxy terminal as a pair so as to generate the terminal group information (Step S109). Then, the terminal group information generator unit 22 transmits the generated terminal group information to the server apparatus 30, while referring to the URL of the terminal group information transmission destination (Step S110).

Secondly, procedures of setting the communication path will be described.

The communication unit 11 transmits the HTTP request to the communication unit 31 (Step S111). Here, as described above, since the cookie request is embedded in every Web page to be generated by the server apparatus 30, the communication unit 11 always transmits the user terminal identifier stored in the Cookie function.

Thereafter, the communication unit 31 transmits the HTTP request received from the communication unit 11, to the path setting unit 36.

Based on the user terminal identifier included in the received HTTP request, the path setting unit 36 identifies the user terminal 10 and acquires the terminal group information from the terminal group information management unit 33 (Step S112).

The path setting unit 36 performs a path setting by setting the proxy terminal 20 as the relay point depending on the contents (contents in which an encrypted communication path should be used, contents to be charged, and the like) (Step S113), and transmits the path information to the path information attached contents generator unit 32 (Step S114).

The path information attached contents generator unit 32 generates a URL in accordance with the received path information (Step S115), generates path information attached contents, and returns the generated path information attached contents to the communication unit 11 (Step S116).

For example, a link character string of the generated path information attached contents is in the form of: <ahref="http://192.168.0.2:8080/?URL=http://www.docomo.ne.jp/purchase.php">.

In the above example, "192.168.0.2" indicates an IP address of the proxy terminal; "8080" indicates the port number for listening of the proxy communication unit 21; and the portion after "?URL=" indicates the URL of the contents of the server apparatus 30 (communication unit 31). FIG. 7 shows an HTTP request including the terminal group information.

Thereafter, a link character string of the path information attached contents is clicked by the user terminal 10, so that the user terminal 10 performs the communication with the proxy communication unit 21, since the IP address and the port number of the proxy terminal are described at the head of the link character string.

The proxy communication unit 21 interprets the portion after the "?URL=", and performs a proxy communication with the communication unit 31 (Step S117).

In such a proxy communication, the proxy communication unit 21 relays the communication between the user terminal 10 and the server apparatus 30 by transmitting, to the server apparatus 30, the HTTP request transmitted from the user terminal 10 and by returning, to the user terminal 10, the HTTP response from the server apparatus 30 based on the link character string of the path information attached contents.

With the foregoing processes, the user terminal 10 can set the communication path with an arbitrary proxy terminal designated by the user as the relay point, as long as the user terminal 10 includes a general Web browser.

Further, the server apparatus 30 can set the communication path depending on the contents, since the path information attached contents is generated by the server apparatus 30.

Multiple methods including such as: reading the bar-code or the character string in the proxy terminal log in contents; using an infrared data communication or a short range radio communication; and the user's manual input, can be considered as a method for acquiring the user terminal identifier from the proxy terminal log in contents, at the proxy terminal 20.

Particularly, by using the method for reading the bar-code or the character string in the proxy terminal log in contents at the proxy terminal 20, an effect that the user terminal 10 is only required to include a display as a function can be produced.

On the other hand, when the proxy terminal 20 is able to acquire the user terminal identifier and to generate the terminal group information by using the function of the user terminal 10, the processes relating to the proxy terminal log in contents may be omitted.

(Operation and Effect)

In this embodiment, terminal group information generation means and terminal group transmission means (terminal group information generator unit 22) is provided. Accordingly, this embodiment makes it possible to transmit the terminal group information to the server apparatus 30, and to manage the user terminal identifier and the proxy terminal network identifier as the pair, at the server apparatus 30.

As a result, it is possible to set the communication path by setting, as the relay point, the proxy terminal arbitrarily specified by the user or the proxy terminal 20 located in a local network to which a user belongs.

Further, according to this embodiment, the terminal group information generator unit 22 of the proxy terminal 20 acquires the user terminal identifier and the terminal group information transmission destination network identifier (URL of the terminal group information transmission destination), generates the terminal group information by combining the user terminal identifier and the proxy terminal network identifier, and transmits the terminal group information to the server apparatus 30 which is described in the terminal group information transmission destination network identifier.

As a result, the proxy terminal 20 is able to generate the terminal group information and to transmit the terminal group information to the server apparatus 30, without adding any special function to the user terminal 10.

Further, according to this embodiment, the proxy terminal 20 includes the terminal group information updating unit 23 which detects a change in a network identifier of the proxy terminal 20 included in the terminal group information, generates new terminal group information, and transmits the new terminal group information to the server apparatus 30.

As a result, the proxy terminal 20 is able to notify the server apparatus 30 of correct terminal group information even when the network identifier of the proxy terminal 20 is dynamically changed. Thereby, this makes it possible to add correct path information to the path information attached contents generated by the server apparatus 30, and thus to set a correct communication path.

According to this embodiment, the server apparatus includes: a terminal group information receiving unit (the communication unit 31); a user terminal identifying unit (the user terminal identifier generator unit 34); the path setting unit 36; and a path information-attached content generator and transmitter unit (the path information attached contents generator unit 32 and the communication unit 31).

As a result, the server apparatus 30 is able to set the communication path depending on the contents by setting, as the relay point, the proxy terminal 20 corresponding to the user terminal 10. Further, the server apparatus 30 is able to transmit the path information attached contents to the user terminal 10, without adding any function to the user terminal 10.

According to this embodiment, the server apparatus 30 includes the proxy terminal log in contents generator unit 35 and a proxy terminal log in content transmitter unit (the communication unit 31). As a result, the user terminal 10 is able to acquire the proxy terminal log in contents.

<Second Embodiment>

(Communication Path Setting System)

Figure 3:
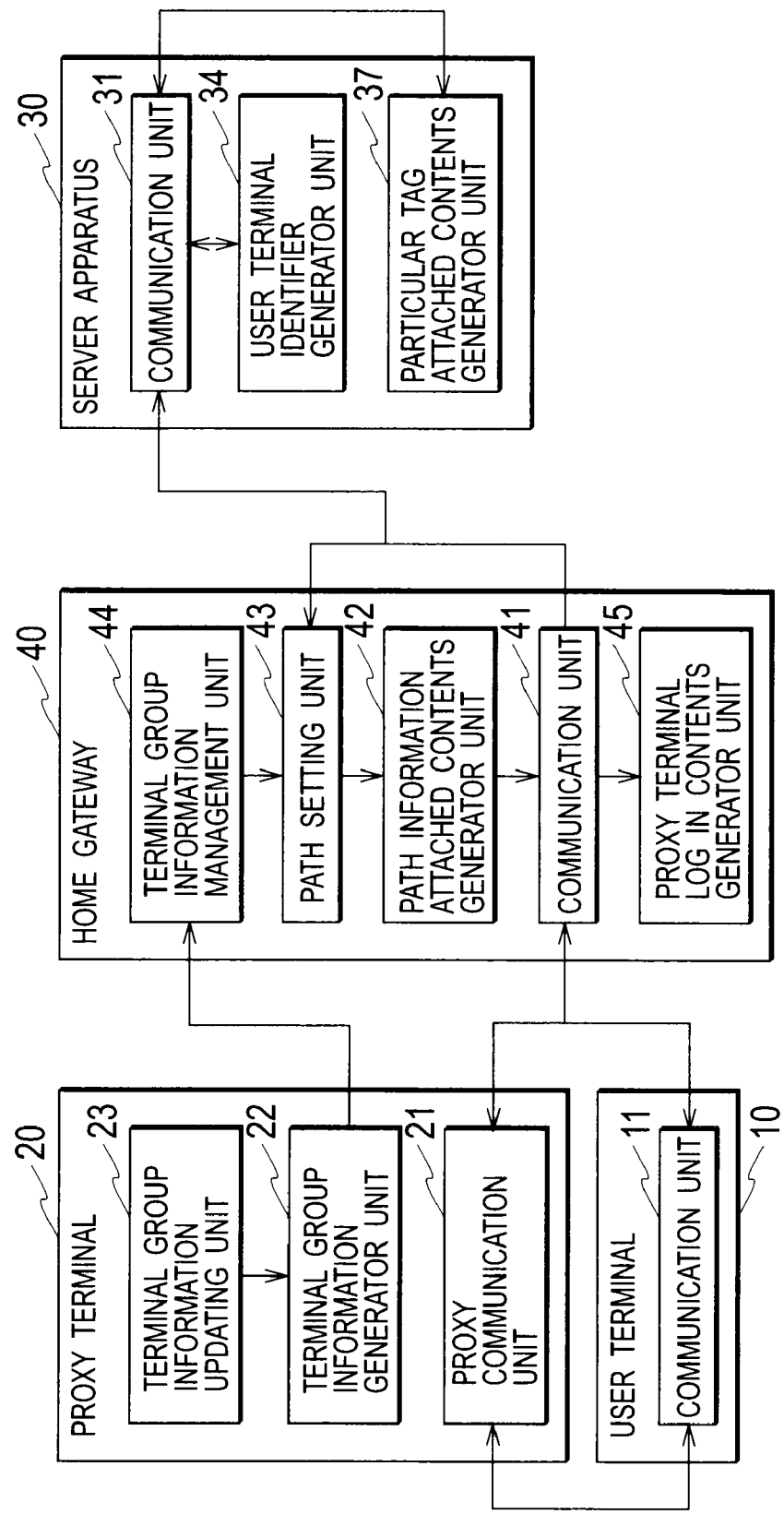
FIG. 3 is a configuration block diagram of a communication path setting system according to a second embodiment.

As shown in FIG. 3, the communication path setting system according to a second embodiment includes a home gateway 40 (a relay apparatus) among the user terminal 10, the proxy terminal 20, and the server apparatus 30.

Configurations of the user terminal 10 and the proxy terminal 20 according to the second embodiment are the same as those of the user terminal 10 and the proxy terminal 20 according to the first embodiment, thus further description thereof will be omitted.

The server apparatus 30 is configured of a general Web server as in the case of the first embodiment.

The server apparatus 30 can perform a communication by using an HTTP protocol, with the user terminal 10 and with the proxy terminal 20. The server apparatus 30 includes a CPU, a memory, a communication module, Web contents, and the like.

The home gateway 40 is a general broadband router. The home gateway 40 includes a CPU, a memory, and a communication module. The home gateway 40 outwardly includes an Internet connection function, while inwardly includes a wired or wireless LAN function. Further, the home gateway 40 includes a router function which relays a communication among the proxy terminal 20, the user terminal 10, and the server apparatus 30.

In addition, the home gateway 40 includes, in many cases, a NAT function which mutually convert an inward-facing private IP address that belongs to an internal terminal, and an outward-facing global IP address that belongs to the home gateway.

In the description hereinbelow, "particular tag" is referred to a tag embedded by the server apparatus 30 in the contents.

The home gateway 40 which received the contents from the server apparatus 30 rewrites information in the particular tag and generates path information attached contents so as to embed the path information in the contents.

Further, "home gateway information" is referred to information which is embedded in an HTTP request so as to be transmitted, and to show the presence of the home gateway 40 to the server apparatus 30.

Module configurations of respective apparatuses according to the second embodiment will be described with reference to FIG. 3. However, the configurations of the user terminal 10 and the proxy terminal 20 are the same as those in the case of the first embodiment, thus further description thereof will be omitted.

The server apparatus 30 includes a communication unit 31, a user terminal identifier generator unit 34, and a particular tag attached contents generator unit 37.

The communication unit 31 returns an HTTP response, in response to the HTTP request from the user terminal 10 and the proxy terminal 20.

In addition, when the home gateway information is transmitted by the HTTP request, the communication unit 31 transmits the home gateway information to the particular tag attached contents generator unit 37.

When an HTTP session is started between the communication unit 11 of the user terminal 10 and the server apparatus 30, the user terminal identifier generator unit 34 generates a user terminal identifier for each of the HTTP session, and returns the generated user terminal identifier to the communication unit 11.

Here, the user terminal identifier is a unique character string and stored in the cookie function of the user terminal 10.

The particular tag attached contents generator unit 37 transmits the contents which includes the particular tag, in response to a request from the communication unit 31 which has received the home gateway information.

Incidentally, a location in which the particular tag is embedded is statically determined based on a policy of the server apparatus 30.

Further, the home gateway 40 includes a communication unit 41, a path information attached contents generator unit 42, a path setting unit 43, a terminal group information management unit 44, and a proxy terminal log in contents generator unit 45.

The communication unit 41 relays the communication among the user terminal 10, the proxy terminal 20, and the server apparatus 30.

Further, depending on the above communication contents, the communication unit 41 requests the proxy terminal log in contents generator unit 45 to generate a proxy terminal login page, relays the terminal group information to the terminal group information management unit 44, and the like.

The path information attached contents generator unit 42 generates the path information attached contents by embedding a link character string which includes the network identifier of the proxy terminal 20, in the particular tag attached contents received from the particular tag attached contents generator unit 37, based on the path information set by the path setting unit 43. Then, the path information attached contents generator unit 42 transmits the path information attached contents to the communication unit 41.

The path setting unit 43 receives the terminal group information from the terminal group information management unit 44 in response to an access from the user terminal 10 and depending on the contents of the particular tag, generates the path information by setting, as a relay point, the proxy terminal 20 identified by the proxy terminal network identifier included in the terminal group information, and transmits the generated path information to the path information attached contents generator unit 42.

The terminal group information management unit 44 receives the terminal group information from the terminal group information generator unit 22, manages the terminal group information for each of the user terminal identifier, and returns the terminal group information in response to a request from the path setting unit 43.

The proxy terminal log in contents generator unit 45 generates the proxy terminal log in contents in response to a request from the communication unit 41, and returns the generated proxy terminal log in contents to the user terminal 10.

In this regard, the proxy terminal log in contents includes the link character string in which the user terminal identifier is added as a parameter, to the URL of the terminal group information transmission destination.

(Communication Path Setting Method)

Figure 4:
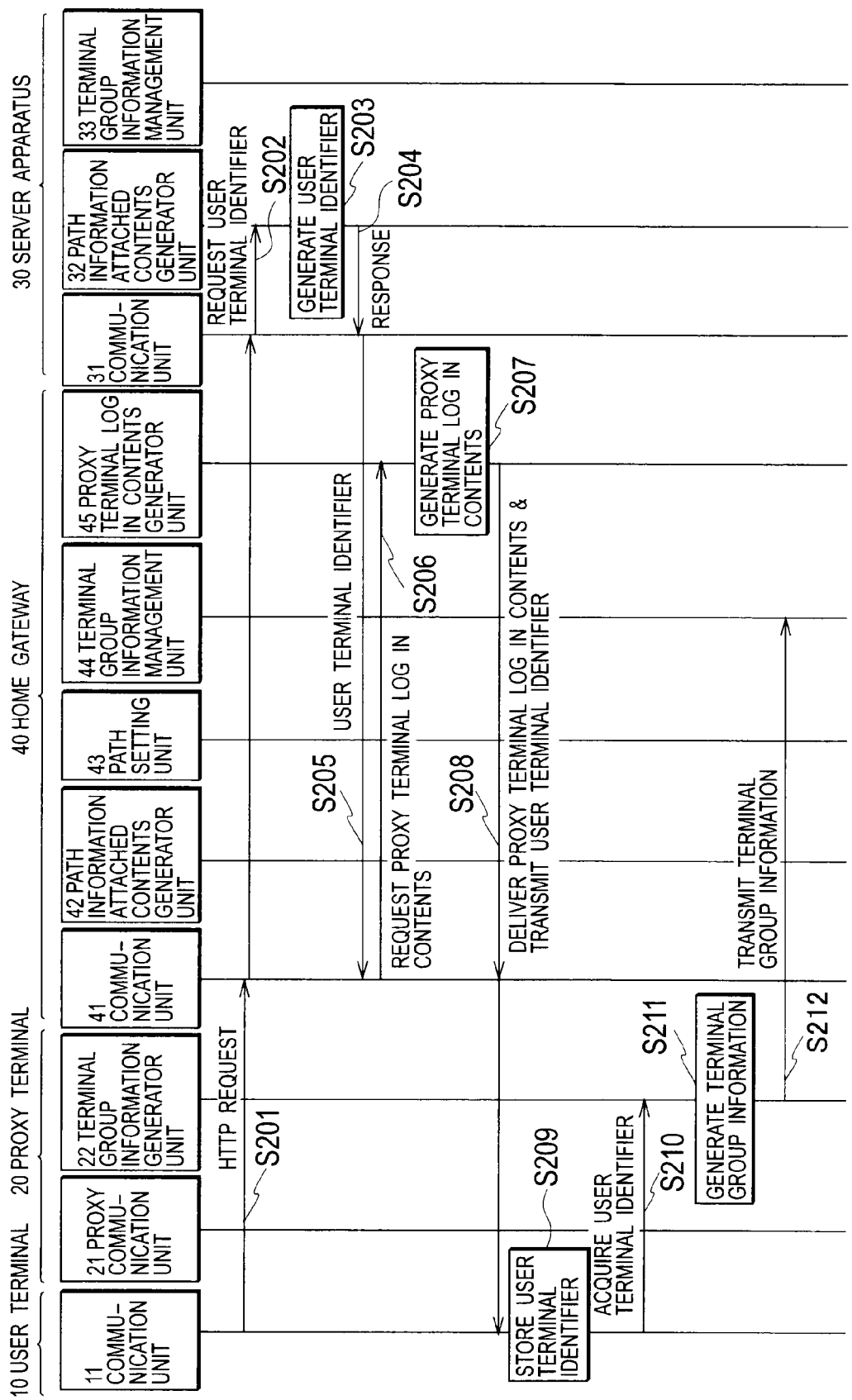
FIG. 4 is a sequence diagram showing a communication path setting method according to the second embodiment (Part 1).
Figure 5:
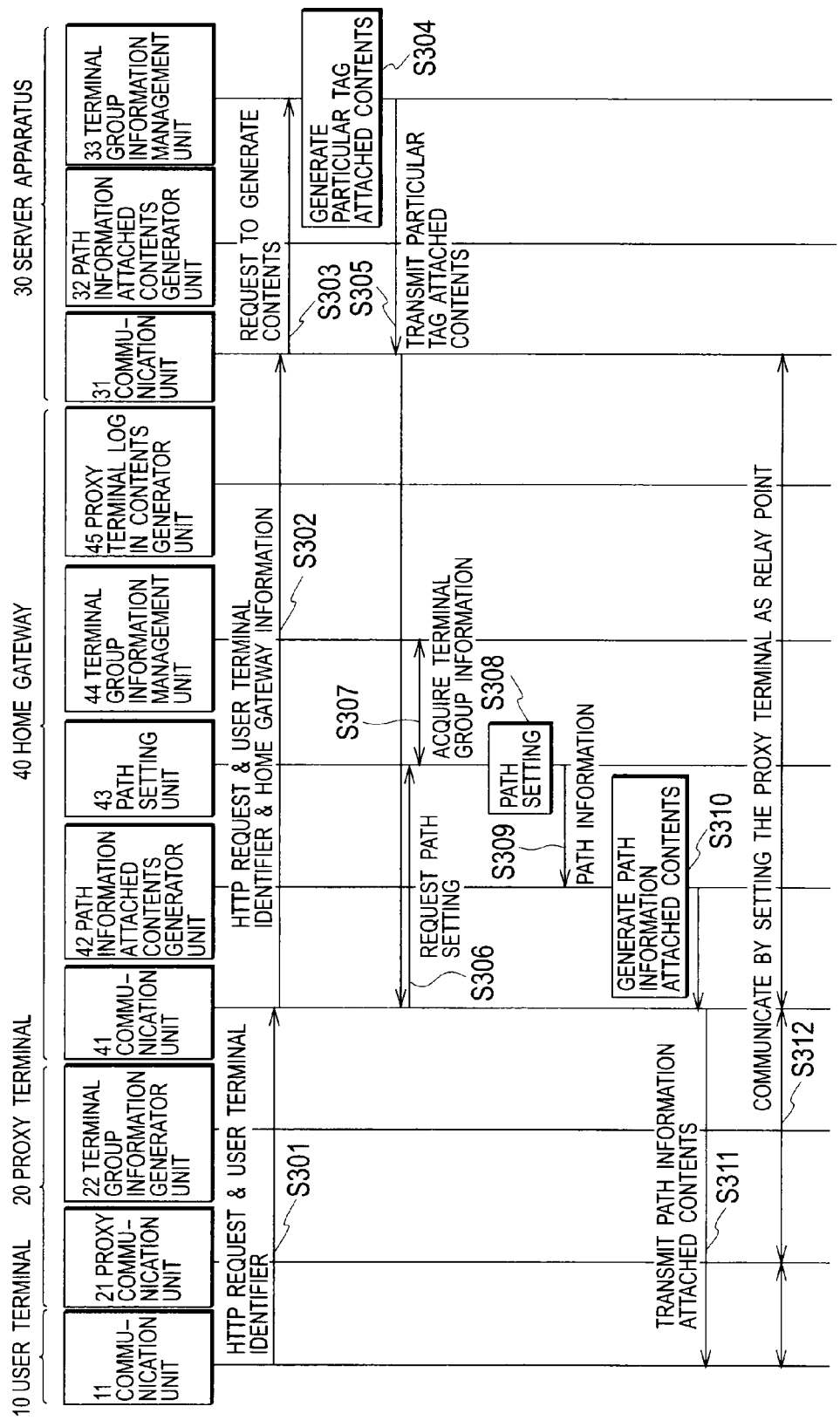
FIG. 5 is a sequence diagram showing the communication path setting method according to the second embodiment (Part 2).

Subsequently, operation of the proxy terminal 20, the server apparatus 30, and the home gateway 40 according to the second embodiment will be described. FIGS. 4 and 5 are sequence diagrams showing operations of the respective apparatuses according to this embodiment.

Firstly, procedures of acquiring the terminal group information will be described.

As shown in FIG. 4, the communication unit 11 of the user terminal 10 transmits an HTTP request to the server apparatus 30 (Step S201).

Here, the home gateway 40 relays all of the communications from the user terminal 10 and the proxy terminal 20 to external networks at the IP level. Accordingly, the HTTP request is forwarded to the communication unit 31 of the server apparatus 30 via the communication unit 41.

The communication unit 31 requests the user terminal identifier generator unit 34 to generate a user terminal identifier so as to identify the user terminal 10 (Step S202).

The user terminal identifier generator unit 34 generates a unique identifier (a character string or the like) for identifying the user terminal 10 (Step S203), and returns the generated identifier to the communication unit 31 (Step S204).

The communication unit 31 embeds the user terminal identifier generated in Step S203, in an HTTP response to the user terminal 10, and returns the above HTTP response to the communication unit 41. Then, the communication unit 41 receives the returned HTTP response (Step S205).

The communication unit 41, which normally only relays the HTTP response to the user terminal 10, requests the proxy terminal log in contents generator unit 45 to generate the proxy terminal log in contents, only when the communication unit 41 confirms a new user terminal identifier (Step S206).

The proxy terminal log in contents generator unit 45 generates a link character string (URL) of the terminal group information transmission destination, in which the received user terminal identifier is added as a parameter (Step S207), embeds the link character string in the proxy terminal log in contents in a two-dimensional bar-code format, and transmits the proxy terminal log in contents to the communication unit 11 via the communication unit 41 (Step S208).

For example, the link character string in the two-dimensional bar-code is in the form of: "http://www.docomo.ne.jp/login.php?SessionID=ABCD12345678."

Here, the portion before "?SessionID=" indicates the URL of the terminal group information transmission destination (e.g., the communication unit 31), and the portion after the "?SessionID=" indicates the user terminal identifier.

Next, the user terminal 10 stores the received user terminal identifier in the cookie function (Step S209). Hereinafter, since the user terminal identifier stored in the cookie function of the user terminal 10 is required to be included in the HTTP request from the user terminal 10 so as to identify the user terminal 10, the server apparatus 30 certainly embeds a cookie request in every Web page to be generated.

Next, the user operates a camera and a two-dimensional bar-code reader attached to the proxy terminal 20 so as to read a two-dimensional bar-code included in the proxy terminal log in contents (Step S210).

As described above, the two-dimensional bar-code includes the URL of the terminal group information transmission destination to which the user terminal identifier is added as the parameter.

The terminal group information generator unit 22 combines the acquired user terminal identifier and the network identifier of the proxy terminal as a pair so as to generate the terminal group information (Step S211). Then, the terminal group information generator unit 22 transmits the generated terminal group information to the server apparatus 30, while referring to the URL of the terminal group information transmission destination (Step S212).

Secondly, procedures of setting the communication path will be described.

As shown in FIG. 5, the communication unit 11 transmits the HTTP request to the communication unit 31 (Step S301).

Here, as described above, since the Cookie request is embedded in every Web page to be generated by the server apparatus 30, the communication unit 11 always transmits the user terminal identifier stored in the cookie function.

In this regard, the communication unit 41 adds home gateway information to the HTTP request and relays the HTTP request to the communication unit 31 (Step S302).

The communication unit 31 recognizes the presence of the home gateway 40 based on the home gateway information, and requests the particular tag attached contents generator unit 37 to generate the particular tag attached contents (Step S303).

The particular tag attached contents generator unit 37 rewrites a link character string in the contents into a particular tag (Step S304) and returns the particular tag attached contents (Step S305).

As shown in FIG. 9, for example, the particular tag in the particular tag attached contents is in the form of: <X-HTTP-Ahref="http://$proxy[2]url$/-.-www.docomo.ne.jp/purchase.php"SessionID="ABCD12345678">Purchase Site</X-HTTP-A>.

Here, the "X-HTTP-A" indicates a tag name representing the particular tag, the portion after "href=" indicates the path information, and the portion after "SessionID=" indicates the user terminal identifier.

Then, the communication unit 31 transmits the particular tag attached contents to the communication unit 41 as an HTTP response.

When the communication unit 41 receives the particular tag attached contents, the communication unit 41 transmits a path setting request to the path setting unit 43 (Step S306).

The path setting unit 43 identifies the user terminal 10 based on the user terminal identifier, and acquires terminal group information from the terminal group information management unit 44 (Step S307).

Depending on the contents included in the particular tag, the path setting unit 43 performs a path setting by setting the proxy terminal 20 as a relay point and by using a proxy terminal network identifier included in the terminal group information (Step S308). Then, the path setting unit 43 transmits the path information to the path information attached contents generator unit 42 (Step S309).

In accordance with the received path information, the path information attached contents generator unit 42 rewrites a character string of the particular tag in the particular tag attached contents, and generates the path information attached contents (Step S310). Then, the path information attached contents generator unit 42 transmits the path information attached contents to the communication unit 11 (Step S311).

For example, a link character string of the path information attached contents is in the form of: <ahref="http://192.168.0.2:8080/?URL=http://www.docomo.ne.jp/purchase.php">.

In the above example, "192.168.0.2" indicates an IP address of the proxy terminal; "8080" indicates the port number for listening of the proxy communication unit 21; and the portion after "?URL=" indicates the URL of the contents of the server apparatus 30 (communication unit 31). FIG. 8 shows the HTTP request including the terminal group information and the home gateway information.

Thereafter, a link character string of the path information attached contents is clicked by the user terminal 10, so that the user terminal 10 performs the communication with the proxy communication unit 21, since an IP address and the port number of the proxy terminal 20 are described at the head of the link character string.

The proxy communication unit 21 interprets the portion after the "?URL=," and performs a proxy communication with the communication unit 31 (Step S312).

In such a proxy communication, the proxy communication unit 21 relays the communication between the user terminal 10 and the server apparatus 30 by transmitting, 10 to the server apparatus 30. the HTTP request transmitted from the user terminal, and by returning, to the user terminal 10, the HTTP response from the server apparatus 30 based on the link character string of the path information attached contents.

(Operation and Effect)

According to the second embodiment, the user terminal 10 can set the communication path with an arbitrary proxy terminal designated by the user as the relay point, as long as the user terminal 10 includes a general Web browser.

Further, according to the second embodiment, instead of the server apparatus 30, the home gateway 40 manages the terminal group information, generates the proxy terminal log in contents, and generates the path information attached contents. This produces an effect that a load on the server apparatus 30 can be reduced.

Further, according to the second embodiment, since the home gateway 40 manages the terminal group information, the terminal group information is not notified to the server apparatus 30. Thus, it is also preferable in terms of privacy protection.

<Third Embodiment>

(Communication Path Setting System)

Figure 10:
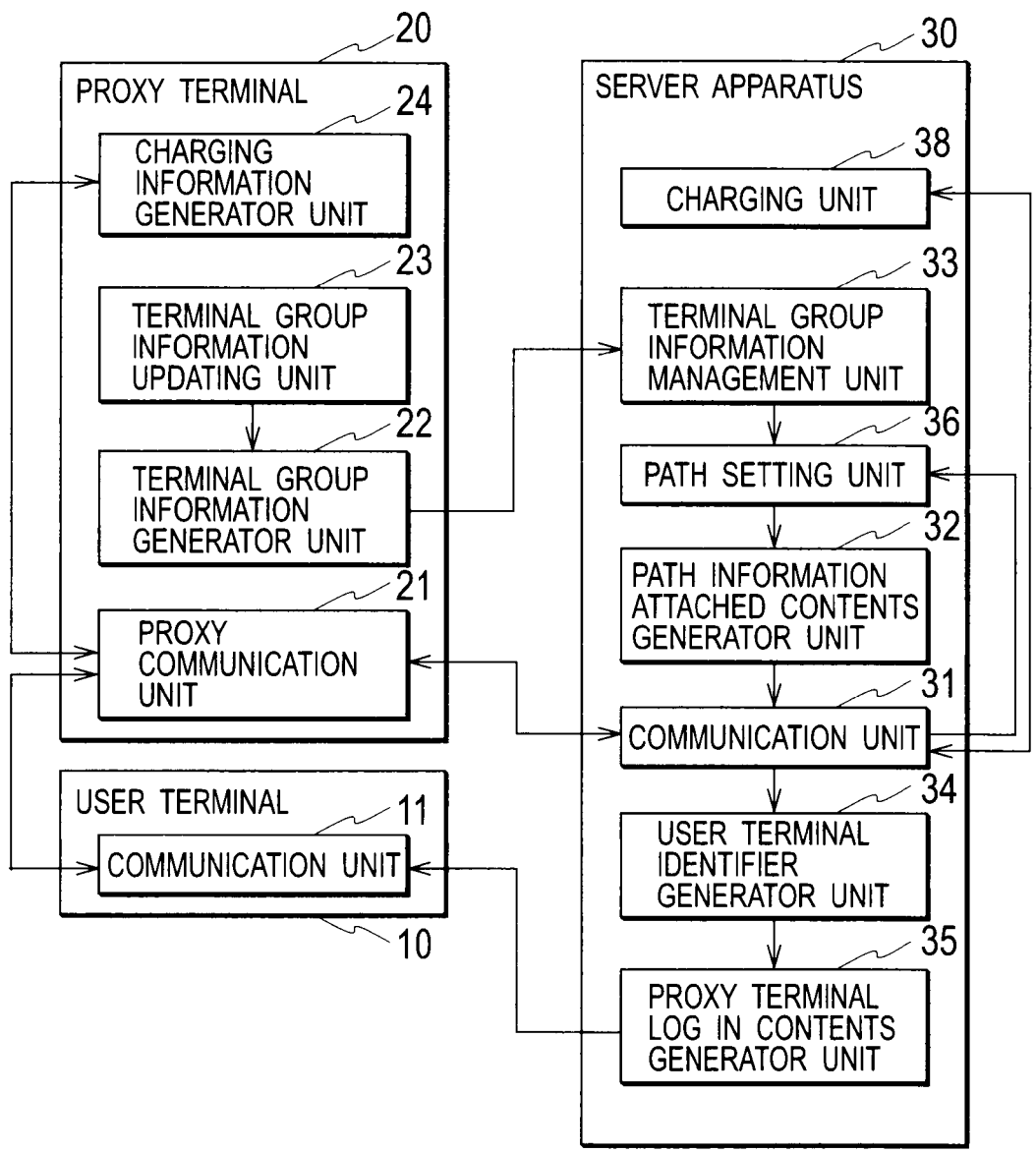
FIG. 10 is a configuration block diagram of a communication path setting system according to a third embodiment.

As shown in FIG. 10, a communication path setting system according to a third embodiment includes a user terminal 10, a proxy terminal 20, and a server apparatus 30.

A configuration of the user terminal 10 according to the third embodiment is the same as those in the first and second embodiments, so that further description thereof will be omitted.

The proxy terminal 20 is a communication terminal such as a cellular phone as in the cases of the first and second embodiments. The proxy terminal 20 includes an Internet communication function, and also includes an HTTP proxy function which relays a communication between the user terminal 10 and the server apparatus 30.

Further, the proxy terminal 20 is a high performance terminal which includes a CPU, a memory, a communication module, a display, and an operation interface. Further, the proxy terminal 20 also includes an encryption decryption function, a client authentication function, a client certificate function, a camera, a two-dimensional bar-code reader, and the like.

The server apparatus 30 is a general Web server as in the cases of the first and second embodiments. The server apparatus 30 can communicate with the user terminal 10 and with the proxy terminal 20 via the Internet by using an HTTP protocol.

The sever apparatus 30 includes a CPU, a memory, a communication module, Web contents, and a database storing information on users, representing users of the proxy terminal 20, and charging information.

In the description hereinbelow, "communication data" is referred to data to be relayed by the proxy terminal 20 in the communication between the user terminal 10 and the server apparatus 30.

To be more specific, the communication data includes; information transmitted as the HTTP request from the user terminal 10 to the server apparatus 30 via the proxy terminal 20, and information transmitted as an HTTP response from the server apparatus 30 to the user terminal 10 via the proxy terminal 20 (e.g., contents and the like).

"Charging information" is referred to information for charging with respect to contents acquired by the user terminal 10. The charging information is added to the HTTP request and transmitted to the proxy terminal 20.

Further, "charging identifier" is information indicating that charging is required. The charging identifier is embedded in the link character string of the path information attached contents transmitted by the communication unit 31 of the server apparatus 30.

Module configurations of respective apparatuses according to the third embodiment will be described with reference to FIG. 10. Here, the configuration of the user terminal 10 is the same as that in the first embodiment, so that a further description thereof will be omitted.

The proxy terminal 20 further includes a charging information generator unit 24 in addition to the configuration of the proxy terminal 20 according to the first and second embodiments.

When the charging identifier is added to the HTTP request relayed by the proxy communication unit 21, the charging information generator unit 24 generates the above-described charging information, and adds the charging information to the HTTP request.

Figure 11:
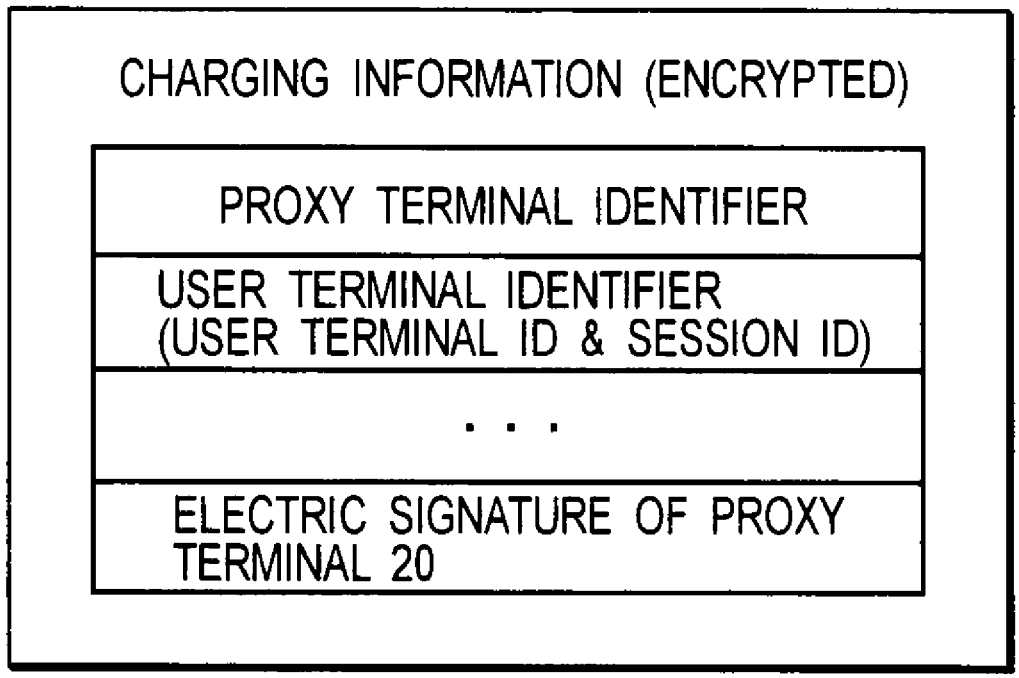
FIG. 11 is an example of charging information according to the third embodiment and a fourth embodiment.

To be more specific, as shown in FIG. 11, "charging information" includes at least a proxy terminal identifier and a user terminal identifier. Further, an electronic signature of the proxy terminal 20 is added thereto and is encrypted.

Here, the proxy terminal identifier is an identifier for identifying the proxy terminal 20 so as to charge the proxy terminal 20. For example, as the proxy terminal identifier, the telephone number of the proxy terminal 20, or the like is cited.

A session ID is included in the user terminal identifier as described above, and communication contents of the user terminal 10 are identified by the session ID. Accordingly, the server apparatus 30 can determine an amount of money to be charged to the proxy terminal 20, based on the session ID.

It should be noted that "charging information" may include information useful for a charging process: such as a communication log of the user terminal 10, a service use log of the user terminal 10, the amount of money to be charged to the proxy terminal 20.

In addition, the electronic signature is added to "charging information," by using, for example, a secret key of the proxy terminal 20. Security may further be enhanced by storing the secret key of the proxy terminal 20 in a tamper resistant device in the proxy terminal 20 such as a SIM card.

Although an encryption method of "charging information" is not particularly specified, a method in which charging information is hidden to third parties by encrypting the charging information using a public key of the server apparatus 30, for example, may also be employed.

The server apparatus 30 further includes a charging unit 38 in addition to the configuration of the server apparatus 30 according to the first and second embodiments.

The charging unit 38 performs the charging process while referring to charging information added to the HTTP request from the proxy terminal 20.

To be more specific, the charging unit 38 decrypts the encrypted charging information, and verifies that the charging information has not been tampered, based on the electronic signature added to the charging information. Then, the charging unit 38 performs the charging process when the charging information has not been tampered.

Here, the charging process is a process for charging the amount of money, which is determined depending on the communication contents of the user terminal 10 identified by using the above session ID.

For example, the charging unit 38 performs the charging process on the proxy terminal by registering the proxy terminal identifier and the amount of money, while relating the proxy terminal identifier and the amount of money to each other, in a database for charging information.

Note that the communication unit 31 according to the third embodiment adds the charging identifier to the link character string in the path information attached contents so as to transmits the path information attached contents to the communication unit 11 of the user terminal 10, when a communication requiring the charging process is occurred (e.g., when the communication unit receives an HTTP request which requests the contents requiring the charging process).

When the charging unit 38 notifies a result indicating that the charging process has successfully been performed, the communication unit 31 according to the third embodiment transmits contents in which the charging process is required, to the communication unit 11 of the user terminal 10 as the HTTP response.

(Communication Path Setting Method)

Subsequently, operation of the proxy terminal 20 and the server apparatus 30 according to the third embodiment will be described. Procedures of acquiring terminal group information and procedures of setting a communication path according to the third embodiment are the same as those in the case of the first embodiment (refer to FIG. 2), so that further description thereof will be omitted. Procedures of charging process for performing a charging process based on a set communication path will be described.

Figure 12:
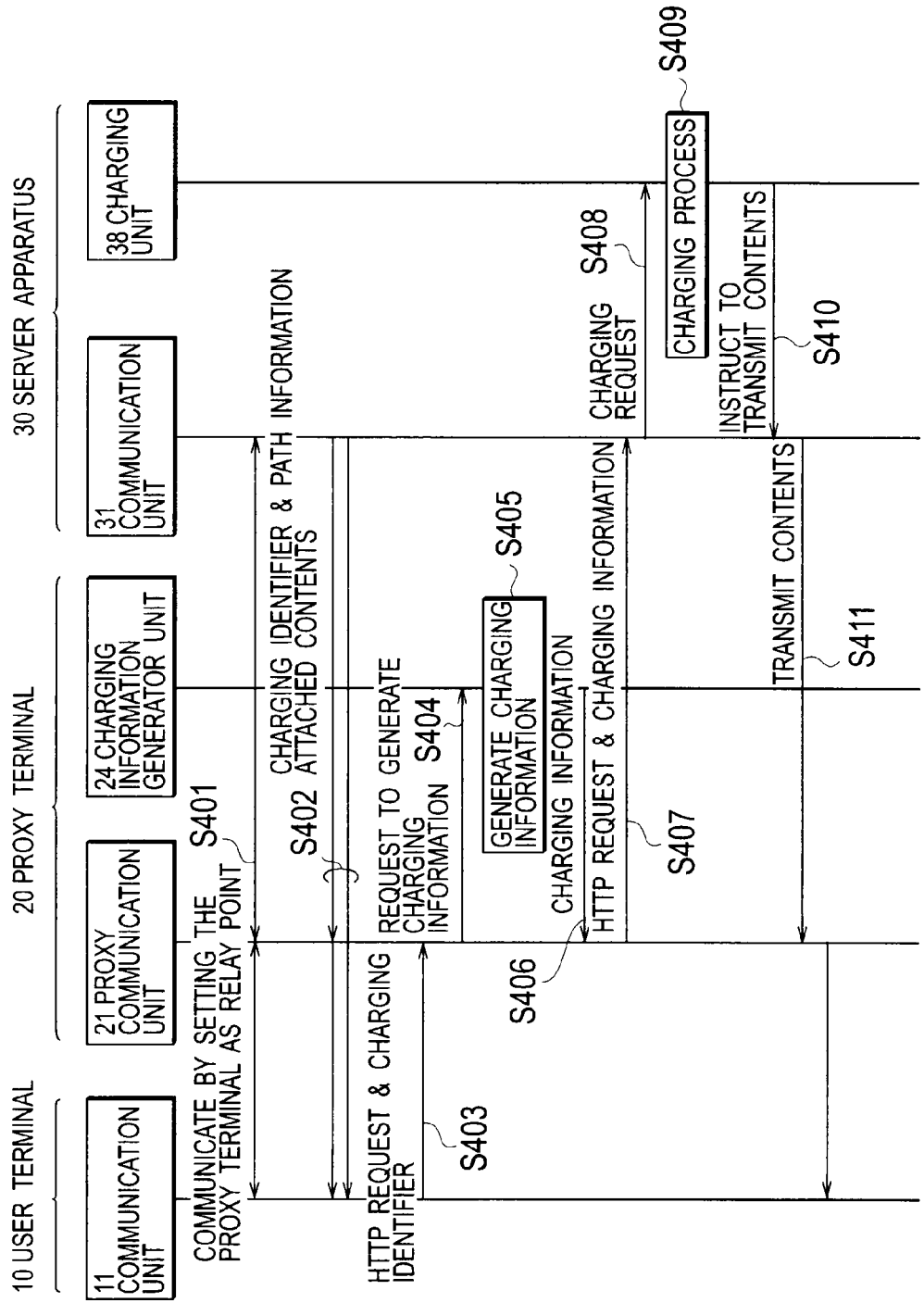
FIG. 12 is a sequence diagram showing a communication path setting method according to the third embodiment.

FIG. 12 is a sequence diagram showing procedures of the charging process according to the third embodiment.

The communication unit 11 of the user terminal 10 clicks the link character string of the path information attached contents, and performs the communication with the proxy communication unit 21 of the proxy terminal 20. In this regard, the proxy communication unit 21 performs the proxy communication with the communication unit 31 of the server apparatus 30 (Step S401).

Here, when the communication requiring the charging process is occurred (e.g., when the communication unit receives the HTTP request which requests contents requiring the charging process), the communication unit 31 adds a charging identifier to the link character string included in the path information attached contents, and transmits the path information attached contents to the communication unit 11 via the proxy communication unit 21 (Step S402).

Incidentally, the communication unit 31 may also directly transmit, to the communication unit 11, the path information attached contents to which the charging identifier is added (Step S402).

For example, a link character string to which the charging identifier is added is in the form of: <ahref="http://192.168.0.2:8080/?URL=http://www.docomo.ne.jp/purchase.php?charging=yes">. In this example, "?charging=yes" indicates the charging identifier.

Next, when the link character string is clicked by the user terminal 10, the communication unit 11 transmits, to the proxy communication unit 21, the HTTP request to which the charging identifier is added (Step S403).

When the proxy communication unit 21 recognizes the charging identifier, the proxy communication unit 21 requests the charging information generator unit 24 to generate charging information (Step S404).

The charging information generator unit 24 generates the charging information shown in FIG. 11 (Step S405), and returns the generated charging information to the proxy communication unit 21 (Step S406).

The proxy communication unit 21 transmits, to the communication unit 31, the HTTP request to which the charging information is added (Step S407).

The communication unit 31 receives the HTTP request to which the charging information is added, and requests the charging unit 38 to perform the charging process (Step S408).

The charging unit 38 decrypts and verifies the charging information, and performs the charging process on the proxy terminal 20 based on the verified charging information (Step S409).

Further, based on a result of the charging process, the charging unit 38 confirms that the charging process has normally been performed, and instructs the communication unit 31 to transmit the contents in which the charging process is required (Step S410).

In response to the instruction from the charging unit 38, the communication unit 31 transmits the contents in which the charging process is required, to the communication unit 11 via the proxy communication unit 21 as the HTTP response (Step S411).

(Operation and Effect)

According to this embodiment, when the user terminal 10 acquires the contents in which the charging process is required, the server apparatus 30 is able to perform the charging process on the proxy terminal 20 based on the charging information transmitted from the proxy terminal 20. Accordingly, the user terminal 10 is able to acquire the contents in which the charging process is required, without including any particular function.

Further, according to this embodiment, the electronic signature of the proxy terminal 20 is added to the charging information to be transmitted to the server apparatus 30 by the proxy terminal 20, and the charging information with the electronic signature is encrypted. As a result, it is possible to safely transmit the charging information between the proxy terminal 20 and the server apparatus 30.

<Fourth Embodiment>

(Communication Path Setting System)

Figure 13:
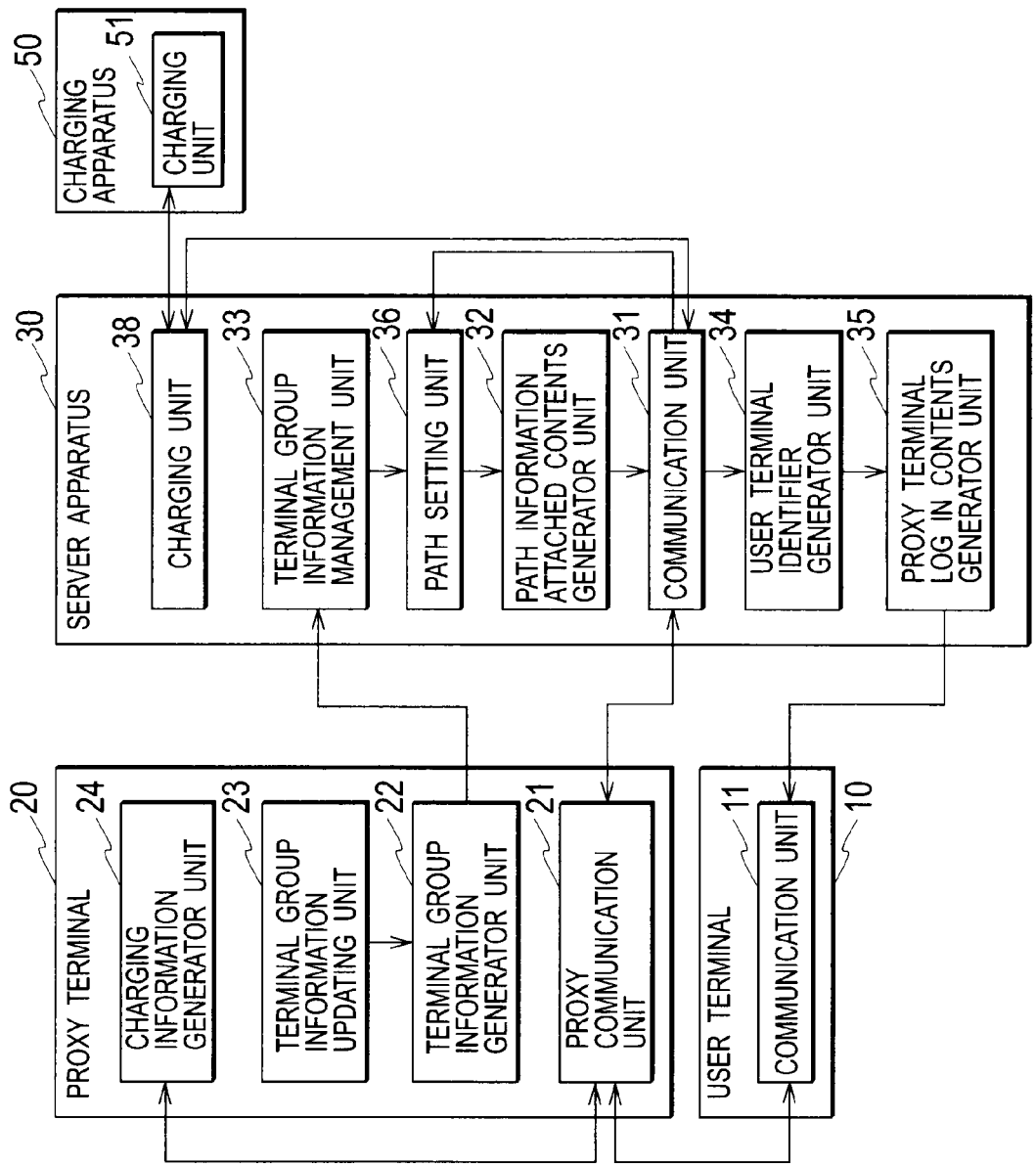
FIG. 13 is a configuration block diagram of a communication path setting system according to the fourth embodiment.

As shown in FIG. 13, a communication path setting system according to a fourth embodiment includes a user terminal 10, a proxy terminal 20, a server apparatus 30, and a charging apparatus 50.

The communication path setting system according to the fourth embodiment is different from that of the third embodiment in that the communication path setting system of the fourth embodiment includes the charging apparatus 50 apart from the server apparatus 30.

Configurations of the user terminal 10, the proxy terminal 20, and the server apparatus 30 according to the fourth embodiment are the same as those of the third embodiment, so that further description thereof will be omitted.

The charging apparatus 50 is a general charging server which performs a charging process.

The charging apparatus 50 can communicate with the server apparatus 30 via the Internet and an intranet, and includes in many cases a safe communication environment such as a VPN.

The charging apparatus 50 includes a CPU, a memory, a communication module, and a database for user information.

Here, the database for the user information indicates charging information and a user of the proxy terminal 20.

Module configurations of respective apparatuses according to the fourth embodiment will be described with reference to FIG. 13. Note that the configurations of the user terminal 10 and the proxy terminal 20 are the same as those of the third embodiment, so that further description thereof will be omitted.

The server apparatus 30 includes a charging unit 38 as in the case of the third embodiment.

When the charging information is added to the HTTP request from the proxy terminal 20, the charging unit 38 according to the fourth embodiment relays the charging information to a charging unit 51 of the charging apparatus 50. Further, the charging unit 38 receives a result of the charging process from the charging unit 51.

The charging apparatus 50 includes the charging unit 51.

The charging unit 51 decrypts the charging information received from the charging unit 38, and verifies that the charging information has not been tampered, based on the electronic signature added to the charging information.

Then, the charging unit 51 performs the charging process on the proxy terminal 20, and transmits the result of the charging process to the charging unit 38, when the charging information has not been tampered.

The charging information according to the fourth embodiment previously includes an amount of money to be charged to the proxy terminal 20 by the charging apparatus 50. Accordingly, the charging unit 51 performs the charging process based on the amount of money previously included.

Incidentally, in the fourth embodiment, for example, since the charging information is encrypted by using a public key of the charging apparatus 50, the charging information can be hidden to the server apparatus 30 and third parties.

(Communication Path Setting Method)

Next, operation of the proxy terminal and the server apparatus according to the fourth embodiment will be described. Procedures of acquiring the terminal group information and procedures of setting the communication path of the fourth embodiment are the same as those of the case of the first embodiment (refer to FIG. 2), so that further description thereof will be omitted; and charging process procedures for performing the charging process based on the set communication path will be described.

Figure 14:
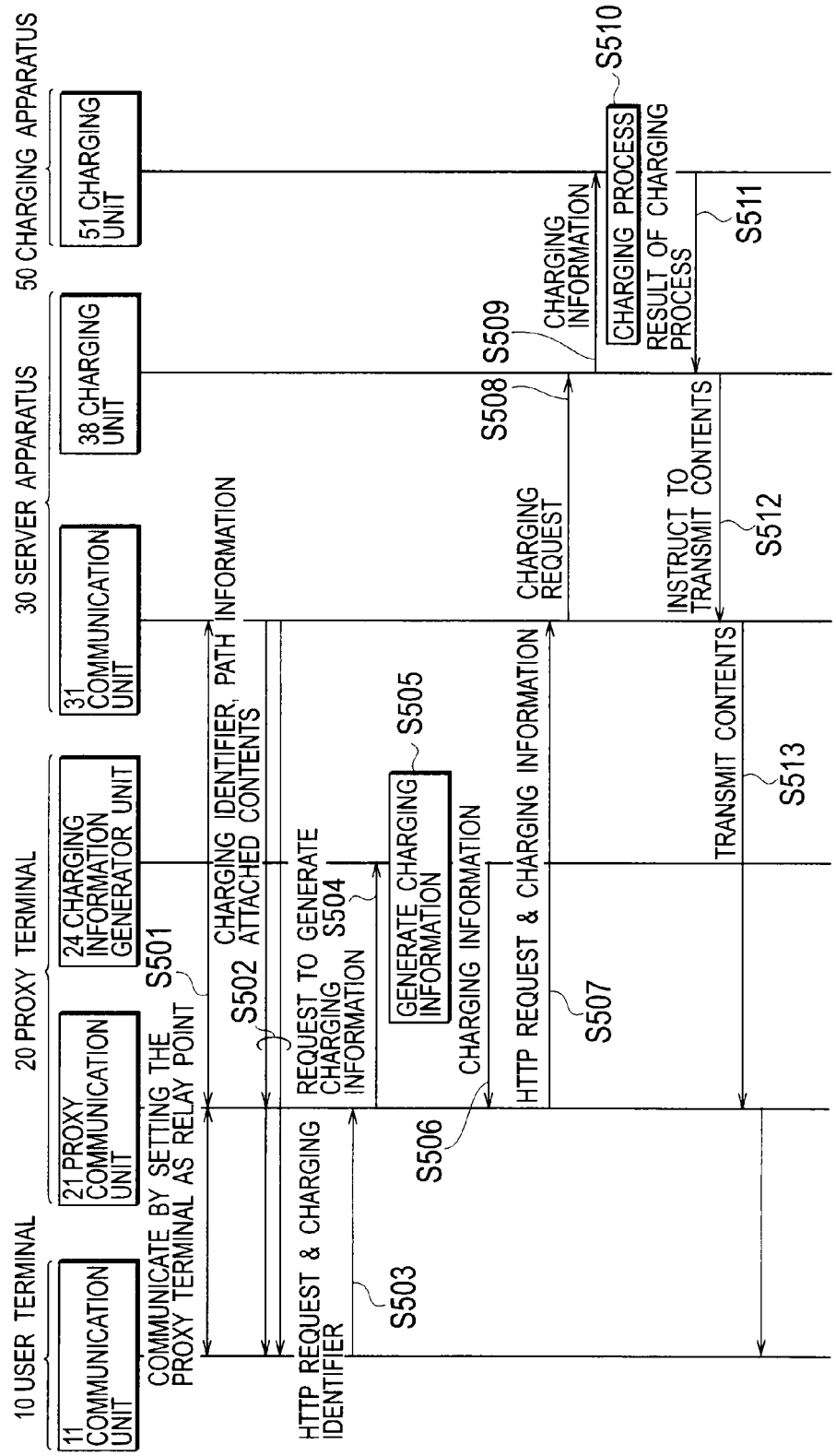
FIG. 14 is a sequence diagram showing a communication path setting method according to the fourth embodiment.

FIG. 14 is a sequence diagram showing charging process procedures according to the fourth embodiment.

Incidentally, Steps S501 to S507 are the same as the charging process procedures of the third embodiment shown in Steps S401 to S407, so that further description thereof will be omitted.

The communication unit 31 receives the HTTP request to which the charging information is added, and requests the charging unit 38 to perform the charging process (Step S508).

The charging unit 38 relays the charging information to the charging unit 51 of the charging apparatus 50 (Step S509).

Based on the received charging information, the charging unit 51 of the charging apparatus 50 performs the charging process on the proxy terminal 20 (Step S510), and returns a result of the charging process to the charging unit 38 (Step S511).

Based on the result of the charging process, the charging unit 38 confirms that the charging process has normally been performed on the proxy terminal 20, and instructs the communication unit 31 to transmit the contents (Step S512).

In response to the instruction from the charging unit 38, the communication unit 31 transmits the contents in which the charging process is required, to the communication unit 11 of the user terminal 10. Thus, the communication is completed (Step S513).

(Operation and Effect)

The above-described embodiment makes it possible to separately include the server apparatus 30 which provides the contents, and the charging apparatus 50 which performs the charging process. Thereby, even when a contents provider and a charging agent are separately existed, the contents in which the charging process is required can be provided to the user terminal 10.

Further, since the server apparatus is not required to perform the charging process, the server apparatus 30 is not required to include such as the database for the user information indicating the charging information and the user of the proxy terminal 20, a verifying function of the electronic signature, a decrypting function for the encrypted charging information, or the like. This produces an effect that a load on the server apparatus 30 can be reduced.

<Fifth Embodiment>

(Communication Path Setting System)

Figure 15:
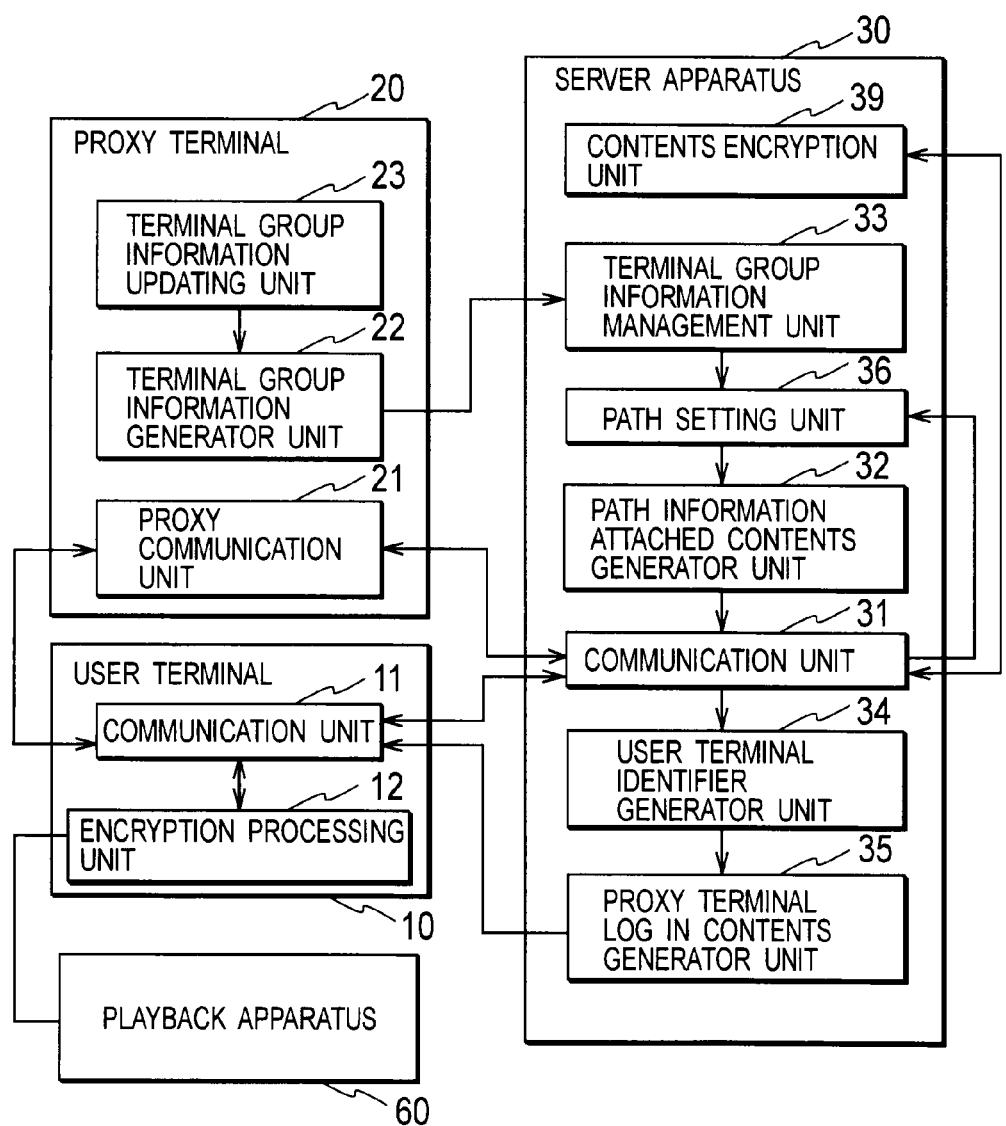
FIG. 15 is a configuration block diagram of a communication path setting system according to a fifth embodiment.

As shown in FIG. 15, a communication path setting system according to a fifth embodiment includes a user terminal 10, a proxy terminal 20, a server apparatus 30, and a playback apparatus 60 connected to the user terminal 10.

The configuration of the proxy terminal 20 according to the fifth embodiment is the same as that of the first embodiment, so that a further description thereof will be omitted.

The user terminal 10 according to the fifth embodiment is different from a terminal such as a TV, as in the first to fourth embodiments, but is a communication terminal such as a set-top box (hereinafter referred to as a STB) widely used for a cable TV and the like. As in the other embodiments, the user terminal 10 includes an Internet communication function, a simple Web browser, and a Cookie function.

Further, the user terminal 10 is different from that of the other embodiments in that the user terminal 10 of this embodiment includes a function of decrypting encrypted contents as in a general STB. In addition, the user terminal 10 is also different from that of the other embodiments in that the user terminal 10 of this embodiment is connected to the playback apparatus 60 for use.

The playback apparatus 60 is an apparatus for reproducing an image decrypted by the user terminal 10, and is referred to such as a TV or the like connected to the user terminal 10.

The server apparatus 30 is configured of a general Web server as in the cases of the other embodiments, but is different from those of the other embodiments in that the server apparatus 30 of this embodiment includes a function of encrypting contents.

Module configurations of respective apparatuses of the fifth embodiment will be described with reference to FIG. 15. Note that the configuration of the proxy terminal 20 is the same as that of the case of the first embodiment, so that a further description thereof will be omitted.

The user terminal 10 includes a encryption processing unit 12 in addition to that of the first embodiment.

The encryption processing unit 12 includes a function of decrypting contents encrypted by a contents encryption unit 39.

Further, the encryption processing unit 12 stores a decryption key delivered from the server apparatus 30 via the proxy terminal 20, and decrypts the contents by using the decryption key.

The server apparatus 30 includes the contents encryption unit 39 in addition to the configuration of the server apparatus 30 according to the first embodiment.

The contents encryption unit 39 encrypts the contents required to be encrypted so that the encrypted contents can be decrypted by using a predetermined decryption key. A method for the encryption is not to be particularly specified, but a common key system in which the same key is used for the encryption and the decryption, may also be employed.

Meanwhile, when the communication related to the contents in which the encryption is required occurs (e.g., the communication unit receives the HTTP request which requests the contents required to be encrypted), the communication unit 31 according to this embodiment transmits the decryption key of the encrypted contents encrypted by the contents encryption unit 39, to the communication unit 11 of the user terminal 10 via the proxy communication unit 21.

Further, the communication unit 31 according to this embodiment directly transmits the encrypted contents encrypted by the contents encryption unit 39, to the communication unit 11 of the user terminal 10.

(Communication Path Setting Method)

Subsequently, operation of the user terminal, the proxy terminal, and the server apparatus according to the fifth embodiment will be described. Procedures of acquiring the terminal group information and procedures of setting the communication path of the fifth embodiment are the same as those of the case of the first embodiment (refer to FIG. 2), so that further description thereof will be omitted. Decryption key delivery procedures in which the decryption key of the encrypted contents is delivered, and contents delivery procedures in which the encrypted contents is directly delivered to the user terminal 10, based on set communication paths, will be described.

FIG. 16 is a sequence diagram showing the decryption key delivery procedures and the contents delivery procedures according to the fifth embodiment.

The communication unit 11 of the user terminal 10 clicks a link character string of the path information attached contents, and performs the communication with the proxy communication unit 21 of the proxy terminal 20. In this regard, the proxy communication unit 21 performs the proxy communication with the communication unit 31 of the server apparatus 30 (Step S601).

In the proxy communication between the proxy communication unit 21 and the communication unit 31, for example, an encrypted communication using an HTTPS protocol is used.

Here, when the communication related to the contents in which the encryption is required occurs (e.g., when the communication unit receives the HTTP request which requests the contents required to be encrypted), the communication unit 31 of the server apparatus 30 transmits the decryption key of the contents to the communication unit 11 of the user terminal 10 via the proxy communication unit 21 (Step S602).

The communication unit 11 transmits the received decryption key to the encryption processing unit 12, and performs an update of the decryption key (Step S603).

Thereafter, when the communication unit 31 delivers the encrypted contents to the user terminal 10, the communication unit 31 of the server apparatus 30 requests the contents encryption unit 39 to encrypt the contents (Step S604).

The contents encryption unit 39 performs the encryption process (a scrambling process or the like) in response to the request (Step S605).

The contents encryption unit 39 returns the encrypted contents to the communication unit 31 (Step S606), and the communication unit 31 directly transmits the encrypted contents to the communication unit 11 (Step S607).

The encrypted contents are transmitted from the communication unit 11 to the encryption processing unit 12 (Step S608). Then, the decryption process is performed by using the decryption key received via the proxy communication unit 21 (Step S609).

The decrypted contents become visible and audible, and are transmitted to the playback apparatus 60 (Step S610).

(Operation and Effect)

According to this embodiment, the server apparatus 30 encrypts the contents and directly transmits the contents to the user terminal 10. Further, the server apparatus 30 transmits the decryption key of the encrypted contents to the user terminal 10 via the proxy terminal 20 in advance. Accordingly, the encrypted contents can be decrypted only by the user terminal 10 which has received the decryption key.

As a result, even when the server apparatus 30 delivers the contents not via the proxy terminal 20, the contents can be prevented from being unduly viewed or heard.

Further, the server apparatus 30 transmits the decryption key of the encrypted contents to the user terminal 10 via the proxy terminal 20. Thereby, when the encrypted contents is delivered, various methods such as a TV broadcasting, a satellite communication, a radio communication, mailing of contents medium, or the like can be used in addition to the internet communication which is not transmitted via the proxy terminal 20.

(Other Embodiment)

The present invention has been set forth with reference to the aforementioned embodiments. However, it should not be understood that the descriptions and the drawings constituting a part of this disclosure limit the present invention. It is apparent to those skilled in the art that various alternatives, modifications, and practices can be achieved based on this disclosure.

For example, since the proxy terminal 20 according to the above embodiments is assumed to be a high performance terminal, a client authentication process and an encrypted communication path building process may also be performed between the proxy terminal 20 and the server apparatus 30. By performing these processes and by setting a path relaying the proxy terminal, a safe communication and charging can be performed.

Further, the proxy terminal 20 can be any communication terminal, in addition to a cellular phone, as long as a general communication function is provided.

Further, the user terminal 10 according to the above embodiments is not limited to be a TV, but may be any communication terminal as long as a general communication function is provided.

Further, for the above communication according to the above embodiments, not only an HTTP protocol, but also various communication protocols may be employed.

Further, for the path information of the path information attached contents according to the above embodiments, an applicable method is not limited to the change of the link character string, but any method can be accepted as long as being performed on the user terminal 10 side. The method includes such as an ActiveX control, Java (registered trademark) script, Java (registered trademark) applet, plug-in softwares of various kinds, or the like. However, the change of the link character string is excellent in that the change of the link character string requires least function for the user terminal.

Further, the proxy terminal 20 according to the above embodiments may also be provided in multiple numbers. If the proxy terminal 20 is provided in the multiple numbers, multiple proxy terminal network identifiers are included for each of the user terminal identifier. This enables the path setting unit 36 of the server apparatus 30 to select the proxy terminal 20 to be set as a relay point, and to set a path by setting the multiple proxy terminals 20 as relay points, depending on the contents.

Moreover, the user terminal 10 of the above embodiments may be provided in multiple numbers. Since the terminal group information is managed for each of the user terminal identifier, the terminal group information is increased in accordance with the increase in the number of the user terminals 10 when the multiple user terminals correspond to one proxy terminal. However, any problem is not occurred with administration.

Furthermore, the user terminal 10 and the proxy terminal 20 according to the above embodiments can be located in the same local network. Located in the same local network produces an effect that the safety of the communications between the user terminal 10 and the proxy terminal 20 becomes easy.

As described above, the present invention has been set forth in detail using the above embodiments. However, it is apparent to those skilled in the art that the present invention is not limited to the embodiments described in this specification. Variations or modifications can be made therein without deviating from the purpose and the scope of the present invention. Accordingly, the description of the above embodiments in this specification aims to explain with examples, and does not include any restrictive meaning.

Industrial Applicability

As has been described above, the present invention makes it possible to provide a proxy terminal, a server apparatus, a proxy terminal communication path setting method, and a server apparatus communication path setting method, which enables a path setting performed by the server apparatus and a path setting which includes, as a relay point, the proxy terminal arbitrarily specified by a user or the proxy terminal located in a local network to which the user belongs, without adding any function to the user terminal.

The invention claimed is:

1. A communication path setting system comprising;
a user terminal having a first level of ability;
a proxy terminal having a second level of ability, which is higher than the first level of ability; and
a server apparatus configured to communicate with the user terminal and the proxy terminal; wherein
the server apparatus is configured to transmit, to the user terminal, proxy terminal log in contents which include a user terminal identifier of the user terminal and a terminal group information transmission destination network identifier of the server apparatus,
the proxy terminal is configured to acquire a user terminal identifier from the user terminal and generate terminal group information which includes the user terminal identifier and a network identifier of the proxy terminal as a pair,
the proxy terminal is configured to acquire the terminal group information transmission destination network identifier, and specify the server apparatus based on the terminal group information transmission destination network identifier,
the proxy terminal is configured to transmit the terminal group information to the server apparatus specified by the terminal group information transmission destination network identifier,
the server apparatus is configured to set a communication path including the proxy terminal as a relay point, based on the terminal group information received from the proxy terminal, and
the proxy terminal is configured to detect a change in the proxy terminal network identifier included in the terminal group information, to generate new terminal group information, and to transmit the new terminal group information to the server apparatus.

2. The communication path setting system according to claim 1, wherein
the user terminal identifier includes at least an identifier for identifying the user terminal, and an identifier for identifying communication contents between the user terminal and the server apparatus.

3. The communication path setting system according to claim 1, wherein
the proxy terminal is configured to generate charging information which includes at least a proxy terminal identifier and the user terminal identifier when the communication data receiving unit receives the communication data transmitted from the user terminal, and
the proxy terminal is configured to relay, to the server apparatus, the communication data to which the generated charging information is added.

4. The communication path setting system according to claim 1, wherein
the server apparatus is configured to encrypt a contents required to be encrypted, so as to be decrypted by a decryption key, and
the server apparatus is configured to transmit the decryption key to the user terminal via the proxy terminal when communication of the contents required to be encrypted occurs.

5. The communication path setting system according to claim 1, wherein
the server apparatus is configured to set the communication path including the proxy terminal as the relay point when the contents is to be charged.

6. The communication path setting system according to claim 1, wherein
the server apparatus is configured to set the communication path including the proxy terminal as the relaying point, when the contents is required to be encrypted.

* * * * *